(12) United States Patent
Popp (10) Patent No.: US 7,036,297 B2
(45) Date of Patent: May 2, 2006

(54) TRIMMER ATTACHMENT

(76) Inventor: Lawrence Popp, 29085 Apple Valley Rd., Sedalia, MO (US) 65301

( * ) Notice: Subject to any disclaimer, the term of this patent is extended or adjusted under 35 U.S.C. 154(b) by 0 days.

(21) Appl. No.: 10/702,954

(22) Filed: Nov. 6, 2003

(65) Prior Publication Data

US 2005/0098328 A1 May 12, 2005

(51) Int. Cl.
*A01D 34/84* (2006.01)
(52) U.S. Cl. .................. 56/12.7; 56/17.2
(58) Field of Classification Search .............. 56/12.7, 56/16.7; 24/278, 569; 403/366; 248/407, 248/411
See application file for complete search history.

(56) References Cited

U.S. PATENT DOCUMENTS

| 32,266 | A | | 5/1861 | Pine |
|---|---|---|---|---|
| 383,281 | A | | 5/1888 | Dodge |
| 2,269,790 | A | * | 1/1942 | Sherrill .................. 24/132 R |
| 3,977,078 | A | | 8/1976 | Pittinger, Jr. |
| 4,224,784 | A | | 9/1980 | Hansen et al. |
| 4,364,435 | A | | 12/1982 | Tuggle et al. |
| 4,442,659 | A | | 4/1984 | Enbusk |
| 4,679,385 | A | | 7/1987 | Carmine |
| 4,704,849 | A | | 11/1987 | Gilbert et al. |
| 4,712,363 | A | | 12/1987 | Claborn |
| 4,756,148 | A | | 7/1988 | Gander et al. |
| 4,803,831 | A | | 2/1989 | Carmine |
| 4,829,755 | A | | 5/1989 | Nance |
| 4,879,869 | A | | 11/1989 | Buckendorf, Jr. |
| 4,914,899 | A | | 4/1990 | Carmine |
| 4,922,694 | A | | 5/1990 | Emoto |
| 4,981,012 | A | | 1/1991 | Claborn |
| 5,092,112 | A | | 3/1992 | Buckendorf, Jr. |
| 5,095,687 | A | * | 3/1992 | Andrew et al. .............. 56/12.7 |
| 5,226,486 | A | | 7/1993 | Naiser |
| 5,228,276 | A | | 7/1993 | Miller |
| 5,263,303 | A | | 11/1993 | Stroud |
| 5,279,102 | A | * | 1/1994 | Foster .................. 56/12.7 |
| 5,317,807 | A | | 6/1994 | Pulley |
| 5,450,715 | A | | 9/1995 | Murray |
| 5,459,985 | A | * | 10/1995 | Gedert .................. 56/17.2 |
| 5,467,584 | A | | 11/1995 | Boyles |
| 5,477,665 | A | | 12/1995 | Stout |
| 5,499,852 | A | * | 3/1996 | Seigendall .................. 394/58 |
| 5,575,448 | A | * | 11/1996 | Battocchio .................. 248/410 |
| 5,603,205 | A | | 2/1997 | Foster |
| 5,661,960 | A | | 9/1997 | Smith et al. |
| 5,771,670 | A | | 6/1998 | Perry |
| 5,809,614 | A | | 9/1998 | Kretser, Jr. |

(Continued)

*Primary Examiner*—Thomas B. Will
*Assistant Examiner*—Toni Newville
(74) *Attorney, Agent, or Firm*—Hovey Williams LLP (57) ABSTRACT

A fully-adjustable lightweight trimmer attachment assembly (10) broadly comprises a wheel (14), a rod (16) extending from the wheel (14), and a mounting mechanism (18) for rotationally mounting the rod (16) to a trimmer (12). The rod (16) preferably includes an axle section (16*a*) through the wheel (14), a trailing section (16*b*) perpendicular to the axle section (16*a*), a centering section (16*c*) parallel to the axle section (16*a*), and a vertical section (16*d*) aligned at ninety degrees to the centering section (16*c*) and at sixty degrees to the trailing section (16*b*). With the vertical section (16*d*) vertical, the trailing section (16*b*) forces the wheel (14) to follow the vertical section (16*d*), providing a castering effect. The mounting mechanism (18) includes a rod mount (30) rotationally secured to the vertical section (16*d*) and a shaft mount (32) operable to be secured to the trimmer (12) and rotate about the rod mount (30).

8 Claims, 4 Drawing Sheets

U.S. PATENT DOCUMENTS

| | | |
|---|---|---|
| 5,826,667 A | 10/1998 | Notaras et al. |
| 5,829,236 A | 11/1998 | Ballard et al. |
| 5,836,142 A | 11/1998 | Maxweli |
| 5,839,262 A | 11/1998 | Sorensen |
| D402,297 S * | 12/1998 | Rappolt ................ D15/17 |
| 5,918,683 A | 7/1999 | Abelsson et al. |
| 5,970,692 A | 10/1999 | Foster |
| 5,970,694 A | 10/1999 | Knox, Jr. |
| 6,050,069 A * | 4/2000 | Elensky .................... 56/7 |
| 6,065,275 A | 5/2000 | Pope |
| 6,085,503 A | 7/2000 | Hutchinson |
| 6,363,699 B1 | 4/2002 | Wang |
| 6,675,565 B1 * | 1/2004 | Appleyard ............. 56/12.7 |
| 6,745,549 B1 * | 6/2004 | Taylor ................... 26/12.7 |

* cited by examiner

TRIMMER ATTACHMENT

BACKGROUND OF THE INVENTION

1. Field of the Invention

The present invention relates to landscaping implements. More particularly, the present invention relates to a fully-adjustable lightweight trimmer attachment assembly that provides lateral stability for the trimmer and supports the trimmer's weight at a uniform height, while allowing the trimmer to move in any direction.

2. Description of Prior Art

String trimmers are commonly used to cut or trim grass, weeds, and other plants. However, most trimmers are heavy and unwieldy, thereby making their use difficult. For example, users must support the trimmer's full weight at a constant height above a lawn, thereby incurring back, shoulder, and arm pain. Additionally, it is often very difficult to hold a trimmer head at a constant height.

In response, trimmer attachments have been designed to support trimmers at a constant height to alleviate some of these problems. However, many attachments are themselves heavy and unwieldy, thereby making their installation, use, and storage difficult. Relatively small and lightweight attachments have also been developed, but they do not provide sufficient adjustability, and the limited adjustment cannot be accomplished without the use of tools, thereby complicating their use.

Accordingly, there is a need for an improved trimmer attachment that overcomes the limitations of the prior art.

SUMMARY OF THE INVENTION

The present invention overcomes the above-identified problems and provides a distinct advance in the art of string trimmers. More particularly, the present invention provides a fully-adjustable lightweight attachment assembly for a trimmer that provides lateral stability for the trimmer and supports the trimmer's weight at a uniform height, while allowing the trimmer to move in any direction. The attachment assembly broadly comprises a wheel to support the weight of the trimmer, a rod extending from the wheel, and a mounting mechanism for mounting the rod to the trimmer.

The wheel preferably presents a substantially straight ground contact line extending substantially the entire width of the wheel, thereby preventing the wheel from rolling over laterally. In other words, the wheel is preferably laterally flat, rather than laterally rounded. Thus, the wheel is operable to easily roll over rough ground while providing a stable base for the rest of the attachment assembly and a head of the trimmer. In preferred forms, the wheel is preferably approximately three and one half inches wide, approximately seven inches in diameter, and is made of hollow plastic, or other suitable material.

The rod preferably includes a substantially horizontal axle section extending through a hub of the wheel, a trailing section extending forwardly and upwardly from the axle section, a centering section extending substantially horizontally from the trailing section and substantially parallel to the axle section, and a vertical section extending substantially vertically upwardly from the centering section. The axle section is operable to transfer the weight of the trimmer to the wheel while allowing free rotation of the wheel. The trailing section is preferably aligned at an approximately ninety degree angle to the axle section. The centering section is preferably aligned at an approximately ninety degree angle to the trailing section. The vertical section is preferably aligned at an approximately ninety degree angle with respect to the centering section and an approximately thirty degree angle with respect to the trailing section. As long as the vertical section is held substantially vertical, the trailing section forces the wheel to follow the vertical section, thereby providing a castering effect. The centering section centers the vertical section over the wheel to facilitate the castering effect in any direction.

The mounting mechanism preferably includes a rod mount secured to the vertical section and a shaft mount that may be secured to the shaft. The rod mount preferably includes a body, two flanges each extending from the body and engaging the vertical section, and a collar secured to the vertical section between the flanges. The collar defines a height of the head of the trimmer and adjusting the collar's position along the vertical section adjusts the height.

The body of the rod mount may freely rotate about the vertical section at the collar. However, the rod mount may also be rigidly secured to the vertical section, thereby preventing rotation. For example, the rod mount may include a threaded fastener penetrating either one of the flanges. In this case, a hand or finger operated knob is preferably affixed to the fastener of the flange in order to allow a user to tighten or loosen the fastener of the flange without tools. Thus, the user may selectively prevent rotation of the rod mount with respect to the vertical section of the rod.

The shaft mount preferably includes a clam-shell bracket secured to the rod mount and a resilient bushing operable to firmly secure the shaft within the bracket. The bracket may rotate about the rod mount in order to adjustably define an angle between the vertical section and the shaft. The bushing is preferably made of rubber and acts as a shock absorber and prevents at least a portion of shock experienced by the wheel from reaching the shaft.

While the shaft mount may freely rotate with respect to the rod mount, the mounting mechanism may also allow the user to fix the angle between the vertical section and the shaft. For example, the rod mount may include one or more threaded plugs that may be selectively threaded into holes through the body of the rod mount. The plugs may fit within holes or indentions in the bracket, thereby preventing rotation of the shaft mount with respect to the rod mount. Specifically, the shaft mount may be fixed with respect to the rod mount, such that the angle between the vertical section and the shaft is rigidly held at a work position or a storage position. In the work position, the angle between the vertical section and the shaft is preferably approximately sixty degrees, thereby allowing the attachment assembly to operate efficiently with an approximately thirty degree angle between the shaft and the ground. In the storage position, the angle between the vertical section and the shaft is preferably approximately zero degrees, such that the vertical section of the rod is roughly parallel to the shaft. Thus, the storage position allows the attachment assembly to be essentially tucked up next to the shaft, thereby minimizing a storage space the trimmer would require with the attachment assembly so configured.

In use, the user wraps the bracket, with the bushing, around the shaft of the trimmer. With the attachment assembly secured to the trimmer, the user may adjust the height of the head of the trimmer by sliding the collar along the vertical section. Once the height is properly adjusted, the user may use the trimmer as needed, while the attachment assembly bears a substantial portion of the weight of the trimmer, thereby making use of the trimmer easier and more comfortable. When the user is finished, the user may place the attachment assembly into the storage position and store the trimmer with the attachment assembly secured thereto in a space not much larger than the trimmer alone.

The attachment assembly of the present invention is lightweight and can be secured to the trimmer in seconds. The attachment assembly also supports the weight of the trimmer while allowing the trimmer to cut at an adjustable uniform height in any direction. The rod may also be locked, by tightening the fastener of the flange, thereby preventing the wheel from swivelling in order to allow the trimmer to be used along a straight line. Furthermore, selective rotation of the rod mount with respect to the vertical section, selective rotation of the shaft mount with respect to the rod mount, and positioning of the attachment assembly along the shaft may all be accomplished without the use of tools.

The attachment assembly is constructed from unitary members, where possible, in order to minimize the attachment assembly's weight. The attachment assembly's construction also minimizes the use of fasteners, thereby simplifying manufacturing, construction, and use of the attachment assembly.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
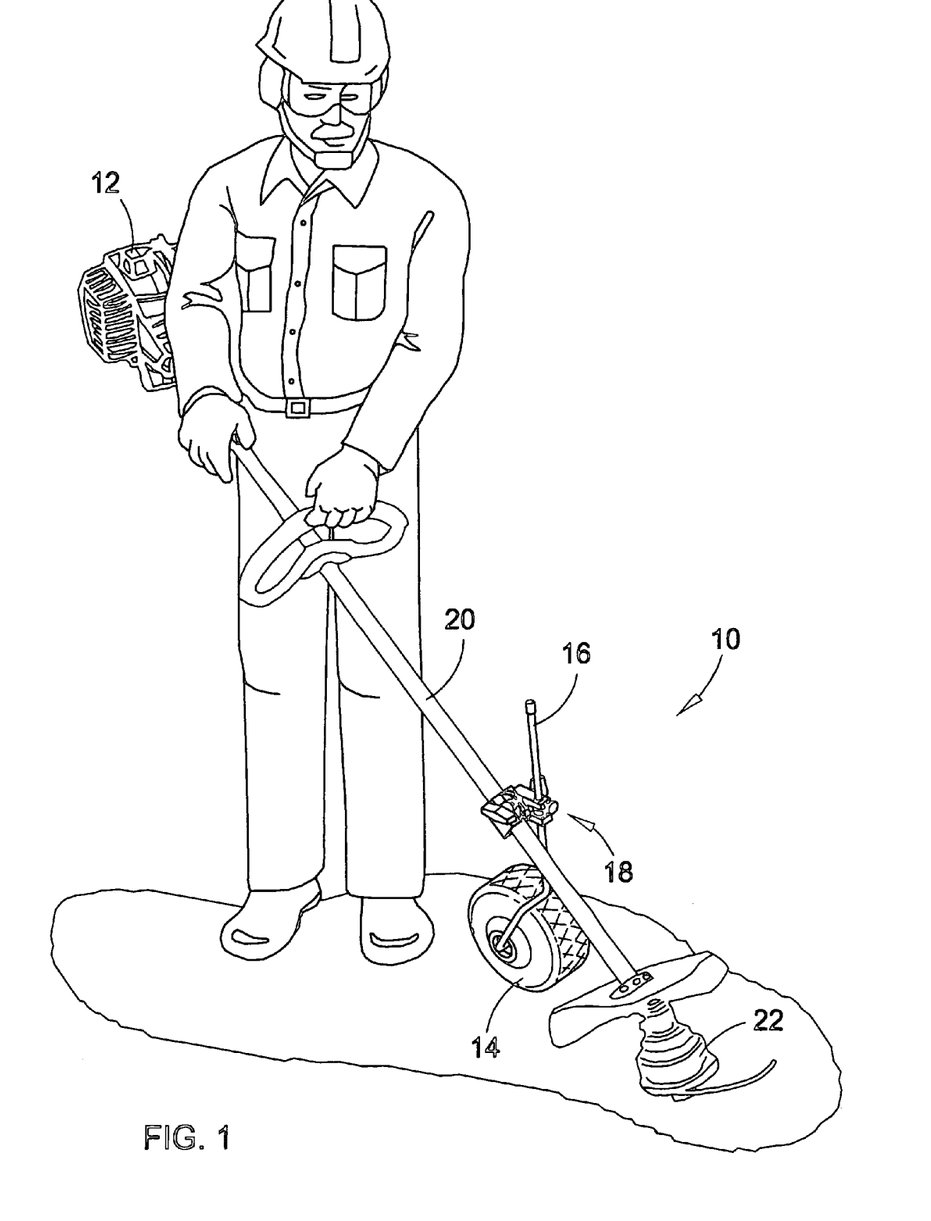
FIG. 1 is a perspective view of an attachment assembly constructed in accordance with a preferred embodiment of the present invention and shown supporting a gas powered string trimmer.

Referring to FIG. 1, the preferred attachment assembly 10 constructed in accordance with a preferred embodiment of the present invention is illustrated supporting a gas powered string trimmer 12. The attachment assembly 10 broadly comprises a wheel 14 to support the weight of the trimmer 12, a rod 16 extending from the wheel 14, and a mounting mechanism 18 for rotationally mounting the rod 16 to a shaft 20 of the trimmer 12.

The wheel 14 may be formed of any suitable material but is preferably formed of hollow plastic. The wheel 14 is preferably approximately three and one half inches wide and approximately seven inches in diameter. The wheel 14 preferably presents a substantially straight ground contact line extending substantially the entire width of the wheel 14, thereby preventing the wheel 14 from rolling over laterally. In other words, the wheel 14 is preferably laterally flat, rather than laterally rounded. Thus, the wheel 14 is operable to easily roll over rough ground while providing a stable base for the rest of the attachment assembly 10, the trimmer 12, and a head 22 of the trimmer 12.

Figure 2:
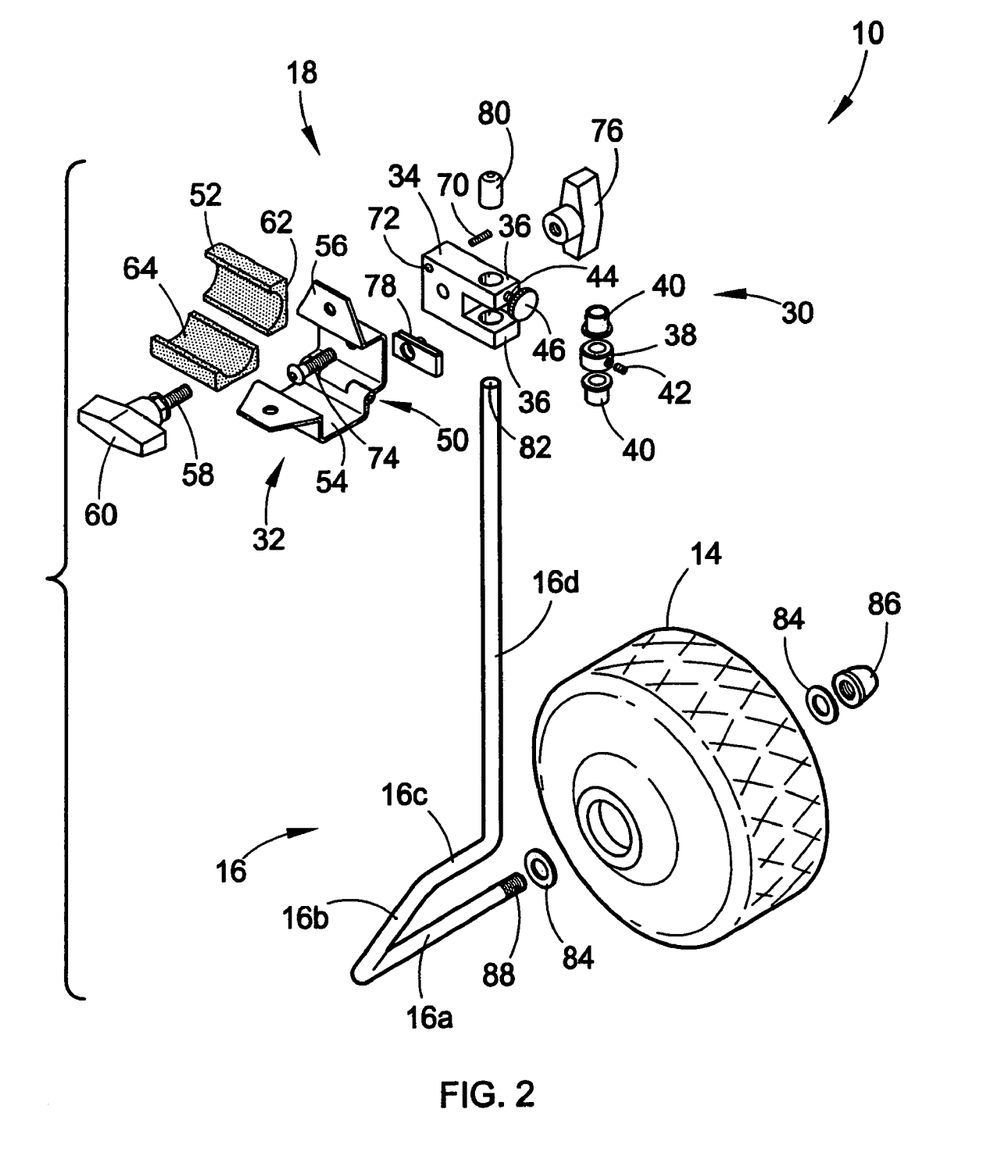
FIG. 2 is an exploded perspective view of the attachment assembly.
Figure 3:
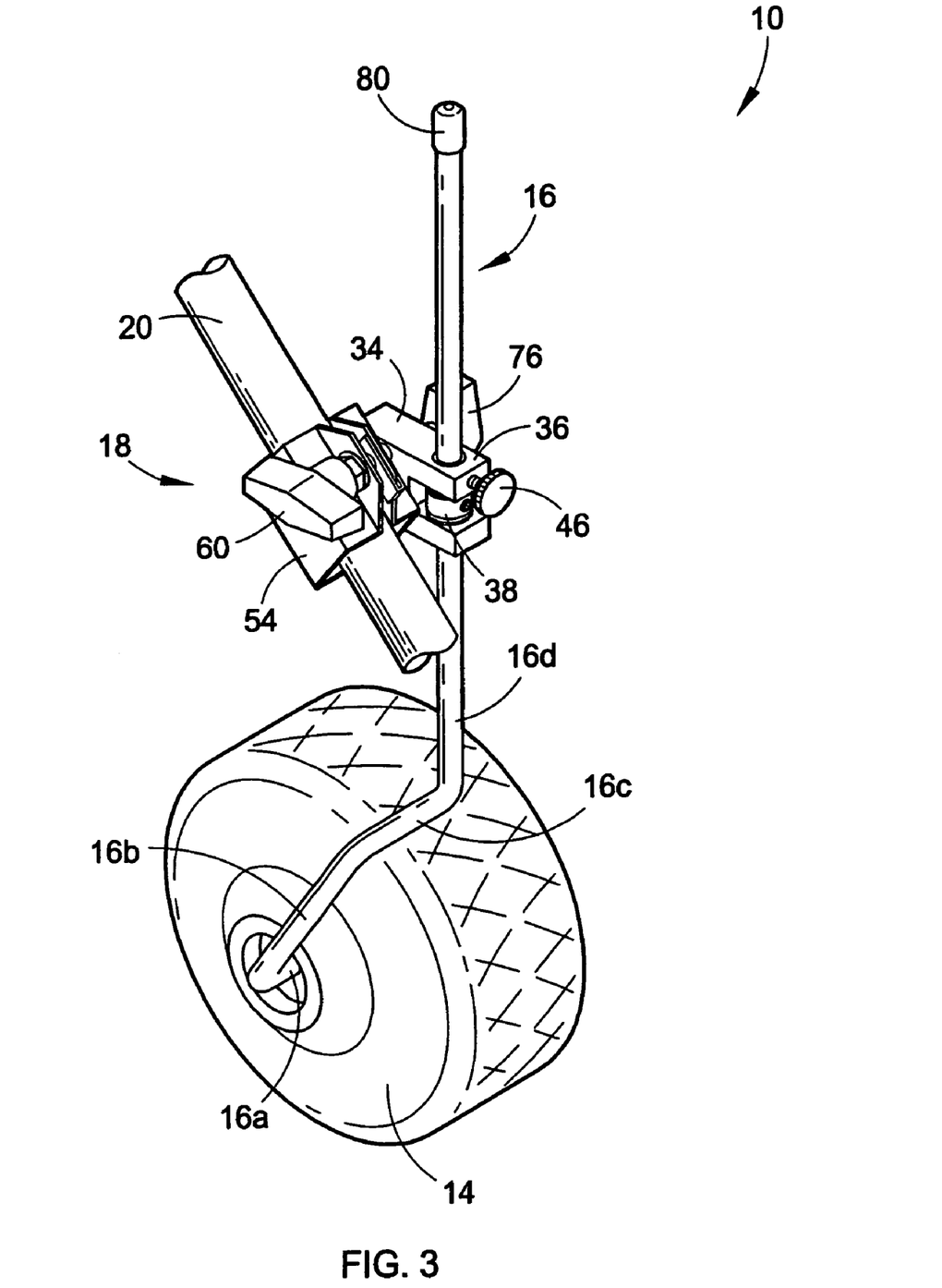
FIG. 3 is a closeup perspective view of the attachment assembly.
Figure 4:
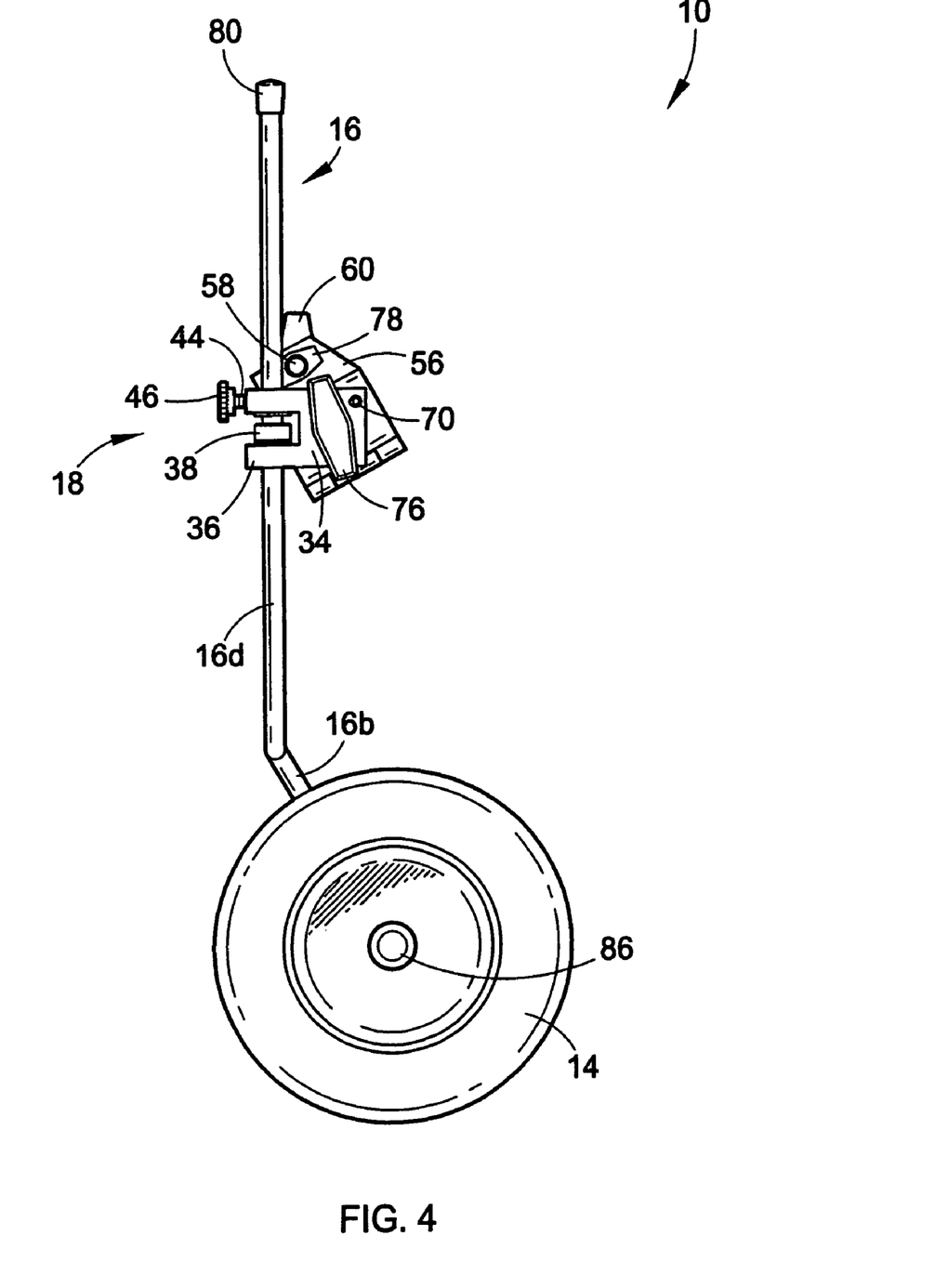
FIG. 4 is an elevation view of the attachment assembly.

The rod 16 is preferably made of a metal that can resist corrosion, such as stainless steel or aluminum. Referring also to FIG. 2, the rod 16 preferably includes a substantially horizontal axle section 16a extending through a hub of the wheel 14, a trailing section 16b extending forwardly and upwardly of the axle section 16a, a centering section 16c extending substantially horizontally from the trailing section 16b and substantially parallel to the axle section 16a, and a vertical section 16d extending substantially vertically from the centering section 16c. The axle section 16a is preferably approximately three and one half inches long and operable to transfer the weight of the trimmer 12 to the wheel 14 while allowing free rotation of the wheel 14. The trailing section 16b is preferably approximately four and three quarter inches long and aligned at an approximately ninety degree angle to the axle section 16a. The centering section 16c is preferably approximately two and three quarter inches long and aligned at an approximately ninety degree angle to the trailing section 16b. The vertical section 16d is preferably approximately twelve inches long and aligned at an approximately ninety degree angle with respect to the centering section 16c and an approximately thirty degree angle with respect to the trailing section 16b. As long as the vertical section 16d is held substantially vertical, the trailing section 16c forces the wheel 14 to follow the vertical section 16d, thereby providing a castering effect. The centering section 16c preferably centers the vertical section 16d over the wheel 14 to facilitate the castering effect in any direction.

The vertical section 16d is preferably centered over the wheel 14 and the shaft 20 is preferably slightly offset to one side of the vertical section 16d, by the mounting mechanism 18. The offset enhances the lateral stability provided by the wheel 14. For example, as shown in FIG. 1, the shaft 20 is offset to the vertical section's 16d right, from a user's perspective. In this case, the trimmer's 12 weight would tend to turn the attachment assembly 10 to the user's right. However, FIG. 1 also shows a string of the trimmer 12 rotating clockwise, from the user's perspective. As the string impacts grass and/or weeds, the string pushes the shaft 20 to the left, thereby tending to turn the attachment assembly 10 to the user's left. Therefore, the tendency of the offset counteracts and cancels the tendency imparted by the string.

In the preferred embodiment, this offset is preferably approximately one and one eighth inch. Of course, if the string, or a blade, rotates counter-clockwise, then the shaft 20 is preferably mounted to the vertical section's 16d left and the mounting mechanism 18 is operable to accommodate such configuration.

The mounting mechanism 18 preferably includes a rod mount 30 secured to the vertical section 16d and a shaft mount 32 that may be secured to the shaft 20. The rod mount preferably includes a body 34, two flanges 36 each extending from the body 34 and engaging the vertical section 16d, and a collar 38 secured to the vertical section 16d between the flanges 34. The rod mount 30 may also include a brass bearing 40 between each flange 36 and the vertical section 16d to ensure easy rotation of the mounting mechanism 18 about the vertical section 16d. The collar 38 defines a height of the head 22 of the trimmer 12 and adjusting the collar's 38 position along the vertical section 16d adjusts the height. The collar 38 is preferably secured to the vertical section 16d with a threaded fastener 42 having a head designed to accept an alien wrench. Tightening the fastener 42 fixes the collar 38 to the vertical section 16d, while loosening the fastener 42 allows the collar 38 to slide along the vertical section 16d, thereby allowing the height to be adjusted.

The body 34 of the rod mount 30 preferably freely rotates about the vertical section 16d at the collar. However, the rod mount 30 may also be rigidly secured to the vertical section 16d, thereby preventing rotation. For example, the rod mount 30 may include a threaded fastener 44 penetrating either one of the flanges 36.

In this case, a hand or finger operated knob 46 is preferably affixed to the fastener 44 of the flange 36 in order to allow the user to tighten or loosen the fastener 44 of the flange 36 without tools. Thus, the user may selectively prevent rotation of the rod mount 30 with respect to the vertical section 16*d* of the rod 16.

The shaft mount 32 preferably includes a substantially rectangular clam-shell bracket 50 secured to the rod mount 30 and a resilient bushing 52 operable to firmly secure the shaft 20 within the bracket 50. The bracket 50 is operable to wrap around the shaft 20 and includes a first half-shell 54 hingedly attached to a second half-shell 56. The second half-shell 56 preferably rotates about the rod mount 30 in order to adjustably define an angle between the vertical section 16*d* and the shaft 20. The bracket 50 preferably includes a threaded fastener 58 that extends through a substantially smooth bore in the first half-shell 54 and into a threaded hole in the second half-shell 56. In this manner, the fastener 58 of the bracket 50 selectively closes or opens the bracket 50, thereby allowing the shaft mount 32 to be selectively secured about the shaft 20. A hand or finger operated knob 60 is preferably affixed to the fastener 58 in order to allow the user to tighten or loosen the fastener 58 without tools. Thus, the user may easily selectively open or close the bracket 50 around the shaft 20 and selectively position the mounting mechanism 18 along the shaft 20. The user may also selectively position the shaft mount 32 on either side of the rod mount 30, in order to position the shaft 20 on either side of the vertical section 16*d*.

The bushing 52 is preferably made of rubber and acts as a shock absorber and prevents at least a portion of shock experienced by the wheel 14 from reaching the shaft 20. The bushing 52 preferably has a substantially rectangular exterior surface 62 to mate inside the bracket 50 and a substantially circular interior surface 64 to wrap around the shaft 20. The bushing 52 may also be split to allow the bushing 52 to be easily wrapped around the shaft 20.

An internal diameter of the bushing 52 is preferably sized to securely hold the shaft 20 without crushing the shaft 20. Thus, the internal diameter of the bushing 52 is preferably between three quarter inches and seven eights of an inch. Alternatively, the bushing 52 may be interchanged to achieve a proper size. For example, the attachment assembly 10 may be packaged with a first bushing having an approximately three quarter inch internal diameter and a second bushing having an approximately seven eighths of an inch internal diameter. In this case, the user may select and use either the first or second bushing, depending upon his or her shaft's size.

It should be noted that a primary concern is preventing rotation of the shaft 20 with respect to the bracket 50, while not marring, crushing, or otherwise damaging the shaft 20. Thus, in the preferred embodiment, the shape of the bracket 50 prevents rotation of the bushing 52 and the resiliency of the bushing 52 prevents rotation of the shaft 20. Alternatively, the bracket 50, and the exterior surface 62 of the bushing 52, could be circular or virtually any other shape, provided that the bushing 52 did not rotate with respect to the bracket 50. In this regard, bonding the bushing 52 to the bracket 50 may be sufficient. The bushing 52 may also be bonded to the bracket 50 for other reasons, such as ease of assembly and use.

While the shaft mount 32 may freely rotate with respect to the rod mount 30, the mounting mechanism 18 may also allow the user to fix the angle between the vertical section 16*d* and the shaft 20. For example, the rod mount 30 may include one or more threaded plugs 70 that may be selectively threaded into lateral holes 72 through the body 34 of the rod mount. The plugs 70 may fit within holes or indentions in the second half-shell 56 of the bracket 50, thereby preventing rotation of the shaft mount 32 with respect to the rod mount 30. Specifically, the shaft mount 32 may be fixed with respect to the rod mount 30, such that the angle between the vertical section 16*d* and the shaft 20 is rigidly held at a work position or a storage position. In the work position, the angle between the vertical section 16*d* and the shaft 20 is preferably approximately sixty degrees, thereby allowing the attachment assembly 10 to operate efficiently with an approximately thirty degree angle between the shaft 20 and the ground. In the storage position, the angle between the vertical section 16*d* and the shaft 20 is preferably approximately zero degrees, such that the vertical section of the rod is roughly parallel to the shaft 20. Thus, the storage position allows the attachment assembly 10 to be essentially tucked up next to the shaft 20, thereby minimizing a storage space the trimmer 12 would require with the attachment assembly 10 so configured.

In any case, the shaft mount 32 is preferably secured to the rod mount 30 with a threaded fastener 74 that may be selectively tightened in order to selectively prevent rotation of the shaft mount 32 with respect to the rod mount 30. A hand or finger operated knob 76 is preferably affixed to the fastener 74 in order to allow the user to tighten or loosen the fastener 74 without tools. Thus, the user may selectively allow or prevent rotation of the shaft mount 32 with respect to the rod mount 30, and thereby control the angle between the vertical section 16*d* and the shaft 20.

While a preferred embodiment of the present invention has been described above, it is understood that alternative embodiments may be utilized. For example, other materials and/or dimensions can be substituted. For example, the wheel 14 is preferably between two and five inches wide, as any narrower would likely not provide sufficient stability and any wider would likely be too large to manage efficiently. The wheel 14 is also preferably between six and nine inches in diameter, as any smaller would likely be too susceptible to uneven ground and any larger would again likely be too large to manage efficiently. It should be apparent that the length of the centering section 16*c* is dependant upon the width of the wheel 14, since the centering section's 16*c* primary purpose is to center the vertical section 16*d* over the wheel 14. Similarly, the length of the trailing section 16*b* is dependant upon the diameter of the wheel 14 and should exceed the wheel's 14 radius by approximately one inch. It should also be apparent that the length of the vertical section 16*d* is dependant upon the design of the trimmer 12. The preferred embodiment has been described for a straight shaft trimmer, where between ten and sixteen inches is typically sufficient for the vertical section 16*d*. However, the attachment assembly 10 may also be designed for use with a curved shaft trimmer, and therefore may require that the vertical section 16*b* be between fourteen and twenty-four inches. Furthermore, the attachment assembly 10 may be designed for use with either the straight shaft trimmer or the curved shaft trimmer, thereby requiring the vertical section 16*d* to be between ten and twenty-four inches.

Additionally, while the second half-shell 56 has been described as having the threaded hole to receive the fastener 58 of the bracket 50, the second half-shell 56 may alternatively include a smooth hole. In this case, the fastener 58 of the bracket 50 may be secured with a nut 78 affixed to or completely separate from the second half-shell 56 of the bracket 50. Furthermore, the fastener 42 of the collar 38 is described above as including a recessed head in order to clear the body 34 and flanges 36 of the rod mount 30 during rotation about the vertical section 16d. However, the body 34 of the rod mount 30 may be larger, thereby increasing a space between the flanges 36 and allowing the fastener 42 of the collar 38 to include a hand or finger operated knob. In this case, every adjustment to the attachment assembly 10 could then be made without the use of tools. Finally, while the attachment assembly 10 has been described for use with the trimmer 12, the attachment assembly 10 may be used with other landscaping implements, such as edgers or other types of trimmers. These and other minor modifications are within the scope of the present invention.

The attachment assembly 10 may also include more components than those described above. For example, the rod 16 may include a top cap 80 secured to a top end 82 of the vertical section 16d in order to protect the user from any edges or points of the top end 82 of the vertical section 16d. The rod 16 may also include one or more washers 84 and a wheel cap 86 to secure the wheel 14 to the axle section 16a. The wheel cap 86 may thread onto the axle section 16a, thereby allowing complete disassembly of the attachment assembly 10, or may simply snap onto the axle section 16a. Therefore, a wheel end 88 of the axle section 16a may be threaded or otherwise configured to accept the wheel cap 86.

In use, the user wraps the bracket 50, with the bushing 52, around the shaft 20 of the trimmer 12. Then, the user threads the fastener 58 of the bracket 50 through the first half-shell 54 and into the second half-shell 56. In this manner, the user secures the attachment assembly 10 to the trimmer 12.

It should be noted that the mounting mechanism 18 is preferably secured as close to the head 22 of the trimmer 12 as possible. However, there are competing issues that prevent the mounting mechanism 18 from being secured directly adjacent the head 22 of the trimmer 12. For example, vertical section 16d is preferably kept substantially vertical. Additionally, the wheel 14 is preferably allowed to completely rotate about the vertical section 16d, and therefore needs to clear the head 22 of the trimmer 12. Specifically, the head 22 typically includes a guard that extends rearwardly in order to protect the user from a string or blade of the trimmer 12. If the mounting mechanism 18 is secured too close to the head 22, then the wheel 14 may hit the guard, thereby preventing the wheel 14 from being able to completely rotate about the vertical section 16d. Thus, the mounting mechanism 18 is preferably secured as close to the head 22 of the trimmer 12 as practicable, while keeping the vertical section 16d vertical and allowing the wheel 14 to clear the head 22 of the trimmer 12. For example, the mounting mechanism 18 is preferably secured to the shaft such that the wheel 14 clears the guard by approximately one inch, when rotated through 360 degrees.

With the attachment assembly 10 secured to the trimmer 12, the user may adjust the height of the head 22 of the trimmer 12. For example, the user may hold the trimmer 12 in a comfortable position and note the height of the head 22. If desired, the user may loosen the fastener 42 of the collar 38 and slide the collar 38 up or down along the vertical section 16d, thereby adjusting the height as the user desires. Once the height is properly adjusted, the user may use the trimmer 12 as needed, while the attachment assembly 10 bears a substantial portion of the weight of the trimmer 12, thereby making use of the trimmer 12 easier and more comfortable.

Should the user desire to use the trimmer 12 in a straight line, the user may tighten the fastener 44 of the flange 36, thereby preventing rotation of the rod mount 30 about the vertical section 16d. Finally, when the user is finished, the user may place the attachment assembly 10 into the storage position. Specifically, the user may loosen the fastener 74, rotate the rod mount 30 about the shaft mount 32, and tighten the fastener 74 once the attachment assembly 10 is in the storage position.

Having thus described a preferred embodiment of the invention, what is claimed as new and desired to be protected by Letters Patent includes the following:

1. An attachment assembly for a trimmer operable to support a head of the trimmer at a constant height above the ground, the attachment assembly comprising:
   a wheel operable to support the trimmer's weight;
   a unitary four sectional rod extending from the wheel, including
      a substantially horizontal axle section extending through a hub of the wheel and operable to transfer the weight of the trimmer to the wheel while allowing free rotation of the wheel,
      a single trailing section extending forwardly and upwardly from the axle section at an approximately ninety degree angle to the axle section,
      a centering section aligned at an approximately ninety degree angle to the trailing section and extending substantially parallel to the axle section, and
      a vertical section extending substantially vertically from the centering section, wherein as long as the vertical section is held substantially vertical the wheel follows the vertical section in order to provide a castering effect; and
   a mounting mechanism for rotationally mounting the vertical section to a shaft of the trimmer, the mounting mechanism including
      a rod mount operable to rotate about the vertical section and selectively slide up and down the vertical section in order to define the height, wherein the rod mount is operable to rotate about the vertical section while engaging the vertical section to prevent sliding up and down the vertical section,
      a shaft mount rotationally secured to the rod mount, thereby operable to adjustably define an angle between the vertical section and the shaft,
      a first knob operable to selectively prevent rotation of the rod mount with respect to the vertical section,
      a second knob operable to selectively prevent rotation of the shaft mount with respect to the rod mount, and
      wherein the knobs may be operated without the use of tools.

2. The attachment assembly as set forth in claim 1, wherein the wheel is approximately three and one half inch wide, approximately seven inches in diameter, and substantially laterally flat.

3. The attachment assembly as set forth in claim 1, wherein the axle section is approximately three and one half inches long, the trailing section is approximately four and three quarter inches long, the centering section is approximately two and three quarter inches long, and the vertical section is approximately twelve inches long.

4. The attachment assembly as set forth in claim 1, wherein the rod mount includes a body, two flanges each extending from the body and engaging the vertical section, and a collar secured to the vertical section between the flanges such that the collar defines the height and adjusting the collar's position along the vertical section adjusts the height.

5. The attachment assembly as set forth in claim 1, wherein the shaft mount includes two holes each operable to accept a plug of the rod mount in order to fix the shaft mount's orientation with respect to the rod mount at either one of two positions.

6. The attachment assembly as set forth in claim 1, wherein the shaft mount includes a substantially rectangular clam-shell bracket operable to wrap around the shaft and a resilient bushing operable to firmly secure the shaft within the bracket and prevent at least a portion of shock experienced by the wheel from reaching the shaft.

7. The attachment assembly as set forth in claim 1, wherein the trailing section is offset from the vertical section with an approximately thirty degree angle between the trailing section and the vertical section.

8. An attachment assembly for a gas powered string trimmer operable to support a head of the trimmer at a constant height above the ground, the attachment assembly comprising:
- a wheel operable to support the trimmer's weight and having an approximately three and one half inch width, an approximately seven inch diameter, and a substantially straight ground contact line operable to provide lateral stability;
- a four sectional unitary rod extending from the wheel, including
  - an approximately three and one half inch long and substantially horizontal axle section extending through a hub of the wheel and operable to transfer the weight of the trimmer to the wheel while allowing free rotation of the wheel,
  - a single trailing section approximately four and three quarter inch long extending forwardly and upwardly from the axle section at an approximately ninety degree angle to the axle section,
  - an approximately two and three quarter inches long centering section aligned at an approximately ninety degree angle to the trailing section and extending substantially parallel to the axle section, and
  - an approximately twelve inch long vertical section extending substantially vertically from the centering section and at approximately thirty degrees with respect to the trailing section, wherein as long as the vertical section is held substantially vertical the wheel follows the vertical section in order to provide a castering effect with the trailing section; and
- a mounting mechanism for rotationally mounting the vertical section to a shaft of the trimmer, the mounting mechanism including
  - a rod mount having a body, two flanges each extending from the body and engaging the vertical section, and a collar secured to the vertical section between the flanges such that the collar defines the height and adjusting the collar's position along the vertical section adjusts the height,
  - a shaft mount rotationally secured to the rod mount with two holes operable to accept a plug of the rod mount in order to fix the shaft mount's orientation with respect to the rod mount at either one of two positions, the shaft mount having a substantially rectangular clam-shell bracket operable to wrap around the shaft and a resilient bushing operable to firmly secure the shaft within the bracket and prevent at least a portion of shock experienced by the wheel from reaching the shaft,
  - a first knob operable to selectively prevent rotation of the rod mount with respect to the vertical section,
  - a second knob operable to selectively prevent rotation of the shaft mount with respect to the rod mount,
  - a third knob operable to selectively close the bracket, and
  - wherein the knobs may be operated by hand without the use of tools.

* * * * *